June 4, 1929.  F. BRANDT  1,715,983
CLAMP BOLT MECHANISM
Filed Sept. 26, 1927
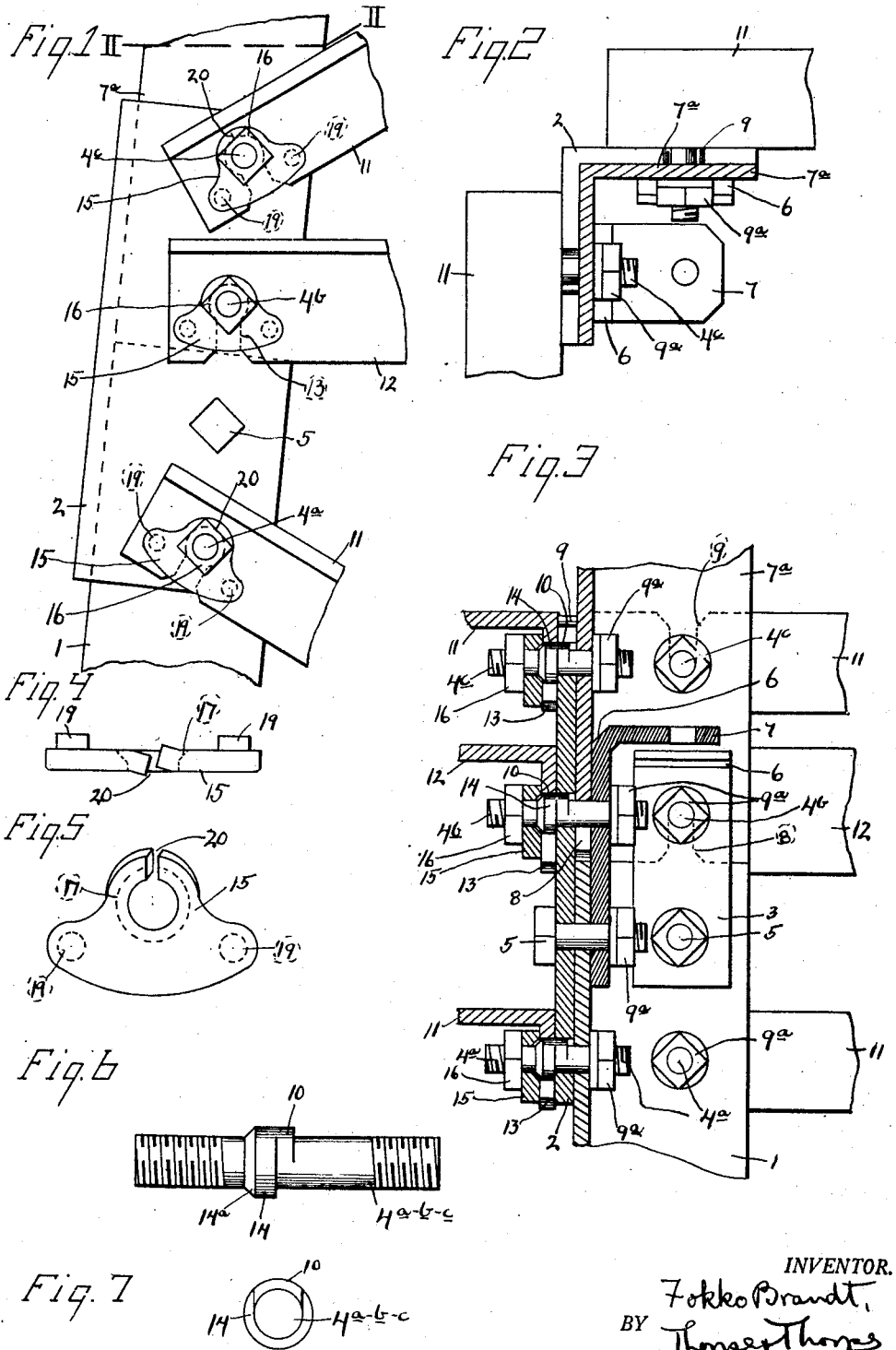
INVENTOR.
Fokko Brandt,
BY Thomas & Thomas
ATTORNEYS.

Patented June 4, 1929.

1,715,983

UNITED STATES PATENT OFFICE.

FOKKO BRANDT, OF KANSAS CITY, MISSOURI, ASSIGNOR TO BRANDT-KRELL ENGINEERING COMPANY, OF KANSAS CITY, KANSAS, A CORPORATION OF KANSAS.

CLAMP-BOLT MECHANISM.

Application filed September 26, 1927. Serial No. 222,175.

This invention relates to an improved bolt clamping mechanism for use in connection with members to be clamped together, and is particularly desirable in connection with angle iron derricks in clamping the sides of abutting leg sections and the braces and girts. It has long been understood that the preferred construction for the ends of girts and braces used in erecting derricks and the like is to form the ends with a bolt-receiving opening, the bolt snugly fitting the opening and thus producing a construction which is practically a strong as the unperforated metal. In such a construction, however, it is necessary to entirely unscrew the nut from the bolt, nuts and bolts are lost and more time is required in the construction or dismantlement of such a derrick. In view of the objections pointed out in connection with the perforated type of construction, it has heretofore been common practice to slot the ends of the girts and braces in order that they may be slipped on the bolt without necessitating the entire unscrewing of the nuts, but such a contruction greatly weakens the joints.

The improved construction of the invention, therefore, has as one of its objects to produce a double-ended bolt clamping connection which will interlock with the braces and girts to prevent them from kicking upwardly and disengaging their slots from the bolts should the nuts become slightly loose, in combination with a special washer for bridging and clamping the slotted ends of the braces and girts to the leg of the derrick.

A still further object is to provide the reinforced or bridging washers with spring arms to function somewhat like a lock washer, but which is primarily intended as a spring means to maintain the parts tightly clamped together.

With the general objects named in view, the invention consists in certain novel and useful features of construction and organization of parts as hereinafter described and claimed; and in order that it may be fully understood, reference is to be had to the accompanying drawing, in which:

Figure 1 is a side elevation of the joint between upper and lower leg sections of a metallic derrick equipped with braces and girts, said joints embodying the improved clamping means of the invention, one set of said braces and girts being omitted.

Figure 2 is a cross section taken on the line II—II of Figure 1, but with the braces and girts in horizontal position and both outside faces of the derrick leg.

Figure 3 is a section on the line III—III of Figure 2.

Figure 4 is an enlarged edge view of a clamp washer forming a part of the invention.

Figure 5 is a plan view of the same.

Figure 6 is an enlarged side elevation of the clamp bolt of the invention.

Figure 7 is an end view of the same.

In the said drawing where like reference characters identify corresponding parts in all of the Figures, 1 indicates the upper end of a derrick section of right angle shape, and 2 and 3 respectively indicate external and internal reinforce plates which project above the end of the leg section 1, the former however being of greater length. The reinforce plates are secured to the end of the leg 1 by means of bolts $4^a$ and 5, the bolt $4^a$ being of peculiar construction to be hereinafter described, and the bolt 5 being of any common and well known type.

The plates 2 and 3 above the end of the leg section 1 carry a bolt $4^b$ corresponding to the bolt $4^a$. The reinforce plates 3 are preferably formed at their upper ends with inclined side portions 6, and one of said plates is provided with a horizontal perforated flange extension 7 which detachably engages with a gin pole, not shown, although both internal reinforce plates 3 may be made to cooperate in sustaining the gin pole if very heavy weights are to be lifted. The gin pole structure is shown in Patent No. 1,539,109, issued May 26, 1925.

The lower end of the upper section $7^a$ of the derrick leg is slipped downwardly between plates 2 and 3 until it comes into edgewise abutment with the end of the leg section 1. The upper section $7^a$ being slotted at its end as at 8 to accommodate the bolts $4^b$, the inclined portions 6 of the internal plates 3 assisting in guiding the upper section into position.

Secured loosely in perforations adjacent the lower end of the upper section 7 are bolts $4^c$ corresponding to the bolts $4^a$ and $4^b$ hereinabove mentioned, the upper ends of the external reinforce angle iron plate 2 being slotted as at 9 to accommodate said bolts $4^c$.

After the parts have been positioned as above described, the inner nuts $9^a$ of the bolts are screwed home until a projecting lug 10 on each bolt has entered into a corresponding socket in the external reinforce plate 2, said lug by interlocking with the socket rigidly maintains the bolts against rotation.

After the parts have been positioned as described, the ends of the braces 11 and girts 12 formed with downwardly-opening key-hole slots 13 are engaged with a collar or flange 14 formed on the bolts adjacent the lug 10, it being understood that the ends of the girts and braces are manipulated to pass the bolts through the slots and then the ends of said members are moved inwardly until the flanges 14 are in proper position, an inclined portion 14$^a$ being provided on the bolt to assist in this movement. It will thus be apparent that the ends of the braces and girts cannot kick upwardly due to the interlocking of the flanges which are of too large diameters to pass through the slots.

The parts as above assembled are clamped together by a clamp plate 15 and nut 16, the clamp plate being formed with a tapering perforation 17 for engaging the bolt to prevent impingement of the plate against the flange 14 which would interfere with the proper clamping of the parts. The clamp plate is formed with a downwardly-extending skirt or bridge portion to reinforce slots in the edges of the braces and girts and is also preferably formed with a pair of projecting pins 19 for interlocking in corresponding sockets spaced from and on opposite sides of the slots in the ends of the braces and girts. It has also been found desirable to split the plate 15 as at 20 and to oppositely strain the parts as shown most clearly in Figure 4 to provide a spring portion to maintain the connections tight.

After the parts have been assembled as above described it will be evident that the nuts will never have to be entirely unscrewed from either end of the bolts, but that either the internal or external nuts may be unscrewed a sufficient distance to permit the pins to be disengaged from the sockets and the key-hole opening in the ends of the braces and girts disengaged from the flange 14 of the bolt.

From the above description it will be apparent that while I have produced a construction possessing all of the features of advantage set out as desirable, it is to be understood that I reserve the right to make all changes properly falling within the spirit and scope of the appended claims.

I claim:

1. The combination with a support having an opening, a member laterally-extending from said support and being formed with a key-hole slot in one of its edges and a socket adjacent to but spaced from the mouth of said slot, a bolt extending through the opening of said support and formed with a lug received in said opening, a reinforce plate bridging the mouth of the slot in said member and being formed with a pin for engaging the socket thereof, and a nut for maintaining the parts in clamped relation.

2. The combination with a support having an opening, a member laterally-extending from said support and being formed with a key-hole slot in one of its edges and a socket adjacent to but spaced from the mouth of said slot, a bolt extending through the opening of said support, a reinforce plate bridging the mouth of the slot in said member and being formed with a pin for engaging the socket thereof, said plate also having a resilient portion, and a nut for maintaining the parts in clamped relation by contact with the resilient portion of said clamp plate.

3. A clamp plate having a bolt receiving opening, and being formed with a resilient nut retaining portion and having means spaced from the bolt receiving opening adapted to bridge a slot to interlock with a member to be clamped to reinforce same against strain.

4. The combination with a structural member having a slot, of a bolt passing through said member, a reinforce plate bridging the slot of said member and interlocked therewith at a point spaced from the slot, and a nut to maintain the plate in clamped relation.

5. The combination with a structural member having a slot, of a bolt passing through said member, a reinforce plate having a resilient nut retaining portion bridging the slot of said member and interlocked therewith at a point spaced from the slot, and a nut retaining the reinforce plate in position.

6. A structural member having a slot and interlocking means spaced from and in a plane intermediate the ends of said slot, a bolt extending through said member, and a clamp plate interposed between the end of bolt and the member and bridging the slot in the latter and having means interlocked with the interlocking means of the latter.

7. A structural member having a slot and a socket spaced from and in a plane intermediate the ends of said slot, a bolt extending through said member, and a plate interposed between the end of the bolt and the member, said plate bridging the slot in the member and having a pin interlocked with the socket of the latter.

8. A structural member having a slot and a pair of sockets spaced from and on opposite sides of and in a plane intermediate the ends of said slot, a bolt extending through said member, and a plate interposed between the end of the bolt and the member, said plate bridging the slot in the member and having pins interlocked with the sockets of the latter.

9. A structural member having a slot and interlocking means spaced from and in a plane intermediate the ends of said slot, a bolt extending through said member, a nut on the bolt, a resilient plate interposed between the nut and the member and bridging the slot in the latter and having means interlocked with the interlocking means of the latter.

10. A structural member having a slot and a pair of sockets spaced from and on opposite sides of and in a plane intermediate the ends of said slot, a bolt extending through said member, a nut on the bolt, a resilient plate interposed between the nut and the member and bridging the slot in the latter and having pins interlocked with the sockets of the latter.

In testimony whereof I affix my signature.

FOKKO BRANDT.